(12) United States Patent
Ji

(10) Patent No.: US 12,394,866 B2
(45) Date of Patent: Aug. 19, 2025

(54) COMPOSITE SEPARATOR AND ELECTROCHEMICAL DEVICE USING THE SAME

(71) Applicants: SK Innovation Co., Ltd., Seoul (KR); SK ie technology Co., Ltd., Seoul (KR)

(72) Inventor: Sang Yoon Ji, Daejeon (KR)

(73) Assignees: SK Innovation Co., Ltd., Seoul (KR); SK ie technology Co., Ltd., Seoul (KR)

(*) Notice: Subject to any disclaimer, the term of this patent is extended or adjusted under 35 U.S.C. 154(b) by 664 days.

(21) Appl. No.: 17/700,568

(22) Filed: Mar. 22, 2022

(65) Prior Publication Data

US 2022/0311096 A1 Sep. 29, 2022

(30) Foreign Application Priority Data

Mar. 23, 2021 (KR) .......................... 10-2021-0037254

(51) Int. Cl.
*H01M 50/454* (2021.01)
*H01M 50/403* (2021.01)
*H01M 50/417* (2021.01)
*H01M 50/434* (2021.01)
*H01M 50/446* (2021.01)
(Continued)

(52) U.S. Cl.
CPC ....... *H01M 50/454* (2021.01); *H01M 50/403* (2021.01); *H01M 50/417* (2021.01); *H01M 50/434* (2021.01); *H01M 50/446* (2021.01); *H01M 50/451* (2021.01); *H01M 50/457* (2021.01); *H01M 50/489* (2021.01)

(58) Field of Classification Search
CPC ............. H01M 50/403; H01M 50/417; H01M 50/434; H01M 50/446; H01M 50/449; H01M 50/451; H01M 50/454; H01M 50/457; H01M 50/489
See application file for complete search history.

(56) References Cited

U.S. PATENT DOCUMENTS

2002/0165291 A1* 11/2002 Choi .................... D06M 10/025
522/120
2015/0079479 A1* 3/2015 Hayakawa ........... H01M 50/411
429/255
(Continued)

FOREIGN PATENT DOCUMENTS

CN          104409674 A   *  3/2015   ........ H01M 10/0525
CN          107123766 B      11/2019
(Continued)

OTHER PUBLICATIONS

Machine translation CN104409674 (Year: 2014).*
(Continued)

*Primary Examiner* — Ictoria H Lynch
(74) *Attorney, Agent, or Firm* — The Webb Law Firm

(57) ABSTRACT

Provided are an organic/inorganic composite porous separator of a new concept, which may show excellent thermal safety, electrochemical safety, lithium ion conductivity, electrolyte impregnation rate, and the like, as compared with a conventional polyolefin-based separator, and an electrochemical device including the separator to promote both securing safety and performance improvement.

20 Claims, 5 Drawing Sheets

(a)

(b)

(51) Int. Cl.
*H01M 50/451* (2021.01)
*H01M 50/457* (2021.01)
*H01M 50/489* (2021.01)

(56) References Cited

U.S. PATENT DOCUMENTS

2019/0348655 A1* 11/2019 Kim .................... H01M 50/429
2020/0373538 A1   11/2020 Kim et al.
2023/0299422 A1*  9/2023 Kim .................... H01M 50/411
                                                        429/246

FOREIGN PATENT DOCUMENTS

| KR | 1020110026186 A | 3/2011 |
| KR | 1020140046137 A | 4/2014 |
| KR | 101402981 B1    | 6/2014 |
| KR | 1020140112667 A | 9/2014 |
| KR | 101516614 B1    | 4/2015 |
| KR | 1020190067397 A | 6/2019 |

OTHER PUBLICATIONS

Liu et al., "An alumina/polyacrylonitrile nanofibrous composite separator via high efficiency electroblown spinning and wet laid technologies for improved lithium ion batteries", Journal of the electrochemical society, 166 (16), A4088-A4096 (2019) (Year: 2019).*

* cited by examiner

COMPOSITE SEPARATOR AND ELECTROCHEMICAL DEVICE USING THE SAME

CROSS-REFERENCE TO RELATED APPLICATION

This application claims priority to Korean Patent Application No. 10-2021-0037254 filed Mar. 23, 2021, the disclosure of which is hereby incorporated by reference in its entirety.

BACKGROUND OF THE INVENTION

Field of the Invention

The following disclosure relates to a composite separator and an electrochemical device using the same. More particularly, the following disclosure relates to an organic/inorganic composite porous separator of a new concept, which may have excellent thermal safety and improved electrolyte wettability, have excellent electrochemical safety due to its low resistance, and show excellent lithium ion conductivity, excellent electrolyte impregnation rate, and the like, as compared with a conventional polyolefin-based separator, and an electrochemical device including the separator to promote both securing safety and performance improvement.

Description of Related Art

Recently, a secondary battery has become higher in capacity and larger in order to be applied to an electric vehicle and the like, and thus, it has become a very important element to secure safety of a battery.

In order to secure the safety, a ceramic layer formed of inorganic particles or inorganic particles and organic particles is introduced on a porous sheet such as polyolefin for solving an ignition problem of a battery caused by a forced internal short circuit by external impact, whereby the battery secures safety to be commercialized.

However, when the ceramic layer is introduced to a porous sheet layer such as polyolefin, a polymer binder is used for adhesion between the ceramic layer and the porous sheet layer and fixed connection between inorganic particles, and in the case of using the organic binder as such, a chemical reaction between an electrolyte solution and organic binder components of the battery occurs to deteriorate battery characteristics.

In addition, the organic binder is dissolved into the electrolyte and eluted, or the organic binder is swollen by the electrolyte solution, to cause various problems which deteriorate battery performance, such as performance deterioration of the electrolyte by closure of a porous layer, gassing, or elution, and an increase in a battery volume by swelling.

RELATED ART DOCUMENTS

Korean Patent Laid-Open Publication No. 10-2019-0067397 (Jun. 17, 2019)

SUMMARY OF THE INVENTION

An embodiment of the present invention is directed to providing a new composite separator, which has excellent adhesive strength between a substrate and a one-dimensional inorganic material, has no elution of an organic binder, is not swollen by an electrolyte solution, has no closure of pores, no gassing, and no electrolyte performance deterioration, and does not increase a battery volume by swelling, as compared with a conventional separator for a secondary battery in which a porous substrate and an inorganic particle layer including an organic binder formed on the substrate layer are formed, by applying a one-dimensional inorganic material on a porous substrate to form a one-dimensional inorganic material layer.

Another embodiment of the present invention is directed to providing a new separator which may improve wettability with a one-dimensional inorganic material in an interface of a porous substrate to lower resistance of a battery cell, by coating a porous substrate with the one-dimensional inorganic material to form a one-dimensional inorganic material layer.

Another embodiment of the present invention is directed to providing a new separator which has better thermal resistance, suppresses a change in battery performance over time, and is chemically stable more permanently, as compared with a conventional separator having a ceramic layer formed of an organic binder and inorganic particles.

Another embodiment of the present invention is directed to providing a separator which has improved electrolyte wettability, has excellent electrochemical stability due to its low resistance, and in particular, even though the separator has a one-dimensional inorganic material layer formed by using a one-dimensional inorganic material on a porous substrate, has a much lower resistance value than that of a porous substrate alone, and thus, has excellent electrical properties, and a lithium secondary battery using the same.

Another embodiment of the present invention is directed to providing a porous composite separator of a new concept which may show a better lithium ion conductivity, a better electrolyte impregnation rate, better thermal safety, and the like than a conventional separator.

Another embodiment of the present invention is directed to providing a separator which has better battery dimensional stability with a high capacity and a larger size and has an effect of further increasing battery safety with little thickness deviation even in the case of using a battery stacked in hundreds of layers for a long time.

Still another embodiment of the present invention is directed to providing an electrochemical apparatus, specifically a lithium secondary battery, having excellent performance.

In one general aspect,
a composite separator includes: (a) a porous substrate; and (b) a one-dimensional inorganic material layer formed by applying a one-dimensional inorganic material on one or both surfaces of the porous substrate, wherein the one-dimensional inorganic material layer includes no organic binder.

In another general aspect,
a composite separator includes: (a) a porous substrate; (b) a one-dimensional inorganic material layer formed of a one-dimensional inorganic material on one or both surfaces of the porous substrate; and (c) "a heterogeneous material-based inorganic composite layer of a different dimension" including inorganic particles and a one-dimensional inorganic material on an upper surface of the one-dimensional inorganic material layer.

In another general aspect,
a composite separator includes: (a) a porous substrate; (b) a one-dimensional inorganic material layer formed of a one-dimensional inorganic material on one or both surfaces of the porous substrate; and (c) an inorganic particle layer including inorganic particles and an organic binder on an upper surface of the one-dimensional inorganic material layer.

The one-dimensional inorganic material refers to a material in the form of hydrophilic inorganic nanowire.

In an exemplary embodiment of the present invention, the one-dimensional inorganic material may be any one or two or more selected from, for example, metals, metal oxides, metal nitrides, metal carbides, metal carbonates, metal hydrates, metal carbonitrides, and the like, and those materials of which the surface is treated with a hydrophilic group.

Specifically, in an exemplary embodiment of the present invention, the one-dimensional inorganic material may be a metal such as Cu, Ag, Au, Ti, Si, and Al or a metal oxide such as $Al_2O_3$, $SiO_2$, AlOOH, ZnO, $TiO_2$, and $HfO_2$, and a one-dimensional inorganic material of which the surface is treated with a hydrophilic group for further increasing hydrophilicity of the one-dimensional inorganic material may be adopted.

In an exemplary embodiment of the present invention, the hydrophilic one-dimensional inorganic material may be one or two or more selected from Cu, Ag, Au, Ti, Si, Al, $Al_2O_3$, $SiO_2$, AlOOH, ZnO, $TiO_2$, $HfO_2$, $Ga_2O_3$, SiC, $SiC_2$, quartz, NiSi, Ag—Ni, ZnS, $CeO_2$, MgO, NiO, $Y_2O_3$, CaO, $SrTiO_3$, $SnO_2$, $ZrO_2$, and the like, but is not limited thereto.

The one-dimensional inorganic material is not particularly limited as long as it is in the form of inorganic nanowire or an inorganic nanofiber, but the inorganic nanowire is preferred since adhesive strength is more significant, and is more preferred for achieving the object of the present invention, and though is not limited thereto, an inorganic nanowire having a curve is more preferred.

In an exemplary embodiment of the present invention, the one-dimensional inorganic material may have, though is not particularly limited thereto, for example, a wire diameter of 1 to 100 nm, a length of 0.01 to 100 μm, and a ratio of L/D (length/diameter) of 100 to 20,000 without limitation, and may independently have a specific surface area of 50 to 4000 $m^2/g$, but is not necessarily limited thereto.

In an exemplary embodiment of the present invention, the one-dimensional inorganic material may have, preferably, a diameter of 1 to 30 nm and a length of 0.01 to 10 μm.

In an exemplary embodiment of the present invention, the one-dimensional inorganic material may have an initial water contact angle $A_1$ and a water contact angle after 7 days $A_2$ which satisfy the following Equations 1 to 3:

$A_1 \leq 90°$ [Equation 1]

$A_2 \leq 90°$ [Equation 1]

$A_2 \leq A_1$ [Equation 1]

In an exemplary embodiment of the present invention, the "heterogeneous material-based inorganic composite layer of a different dimension" from the one-dimensional inorganic material layer does not include an organic binder in principle, but when the organic binder is used as needed, the organic binder may be used at a content of 10 wt % or less, preferably 5 wt % or less, and more preferably 1 wt % or less with respect to the total content of each of the layers, within a range in which performance is not deteriorated by chemical deterioration or swelling by an electrolyte.

When the inorganic particle layer including the organic binder is formed on the one-dimensional inorganic material layer, 70 to 99.9 wt % of the inorganic particles and 0.1 to 30 wt % of the organic binder may be included, but the present invention is not necessarily limited thereto.

In an exemplary embodiment of the present invention, the composite separator has a Gurley permeability of 20 sec/100 cc or less, specifically 150 sec/100 cc or less, and more specifically 120 sec/100 cc or less, but is not limited thereto.

In an exemplary embodiment of the present invention, when the one-dimensional inorganic material layer is formed on one or both surfaces of the porous substrate, the inorganic nanowires or the inorganic nanofibers as the one-dimensional inorganic material interwind with each other, and also penetrate the pores of the substrate layer and are anchored to further increase impregnation in an electrolyte, thereby further lowering the resistance of the composite separator and rather having a lower resistance value than a single separator of a porous substrate, and thus, excellent electrical properties may be achieved.

In addition, the one-dimensional inorganic material is anchored to the porous substrate, thereby providing a new separator having sufficient adhesive strength or better adhesive strength to the porous substrate, without use of an organic binder having chemical deterioration to an electrolyte. Therefore, a new composite separator to further increase electrical and chemical properties of a secondary battery may be provided.

In addition, as an exemplary embodiment of the present invention as described above, a separator having a one-dimensional inorganic material layer in which no organic binder is used may suppress a change in battery performance overtime since no organic binder is used, and may provide a more permanently chemically stable new separator.

In addition, according to the present invention, a separator for a secondary battery having better thermal resistance may be provided.

As in the present invention, a new separator having significantly improved electrical properties such as a capacity retention of a secondary battery with smooth movement of lithium ions may be provided by not using or minimizing the organic binder to completely or sufficiently remove closure of pores by the organic binder or elution of the organic binder into the electrolyte.

In another general aspect, an electrochemical apparatus, specifically a lithium secondary battery, having excellent performance is provided.

In another general aspect, a composite separator includes: (a) a porous substrate; (b) a one-dimensional inorganic material layer formed of a one-dimensional inorganic material on one or both surfaces of the porous substrate; and (c) "a heterogeneous material-based inorganic composite layer of a different dimension" including inorganic particles and a one-dimensional inorganic material on an upper surface of the one-dimensional inorganic material layer.

In another general aspect, a composite separator includes: (a) a porous substrate; (b) a one-dimensional inorganic material layer formed of a one-dimensional inorganic material on one or both surfaces of the porous substrate; and (c) an inorganic particle layer including inorganic particles and an organic binder on an upper surface of the one-dimensional inorganic material layer.

The inorganic particles are not particularly limited as long as they are commonly used in the art, but, for example, may be one or two or more selected from Cu, Ag, Au, Ti, Si, Al, $Al_2O_3$, $SiO_2$, AlOOH, ZnO, $TiO_2$, $HfO_2$, $Ga_2O_3$, SiC, $SiC_2$, quartz, NiSi, Ag—Ni, ZnS, $CeO_2$, MgO, NiO, $Y_2O_3$, CaO, $SrTiO_3$, $SnO_2$, $ZrO_2$, lithium-based inorganic materials, piezoelectric inorganic metal mixtures, composite metal oxides of these metals, and the like, but are not limited thereto.

More preferably, the inorganic particles may be any one or two or more selected from boehmite, $Al_2O_3$, $TiO_2$, $CeO_2$, MgO, NiO, $Y_2O_3$, CaO, $SrTiO_3$, $SnO_2$, ZnO, $ZrO_2$, lithium-based inorganic materials, piezoelectric inorganic metal mixtures, and composite metal oxides of these metals.

The shape of the particles is not particularly limited, and for example, may include all of round, square, oval, and random shapes, or a mixed form thereof.

The size of the particles is not particularly limited as long as the object of the present invention is achieved, but, for example, an average particle diameter may be in a range of 0.001 to 20 μm.

The one-dimensional inorganic material is not particularly limited as long as it is an inorganic nanowire or an inorganic nanofiber commonly used in the art, but, preferably, may have a wire diameter of 1 to 100 nm, a length of 0.01 to 100 μm, and a L/D (length/diameter) ratio of 100 to 20,000 without limitation. In addition, the inorganic material may have a specific surface of 50 to 4000 $m^2/g$, but is not necessarily limited thereto.

Though the category of the one-dimensional inorganic material is not limited, but the one-dimensional inorganic material may be produced from any one or two or more selected from metals, carbon, metal oxides, metal nitrides, metal carbides, metal carbonates, metal hydrates, metal carbonitrides, and the like, and, for example, may be one or two or more selected from Cu, Ag, Au, Ti, Si, Al, $Al_2O_3$, $SiO_2$, AlOOH, ZnO, $TiO_2$, $HfO_2$, $Ga_2O_3$, SiC, $SiC_2$, quartz, NiSi, Ag, Au, Cu, Al, Si, Ag—Ni, ZnS, $Al_2O_3$, $CeO_2$, MgO, NiO, $Y_2O_3$, CaO, $SrTiO_3$, $SnO_2$, boehmite, $ZrO_2$, and the like, but is not limited thereto.

The porous substrate of the present invention is not particularly limited as long as it is a material used in the field of a lithium secondary battery, but, for example, may be a polyolefin porous film and in the form of woven fabric or non-woven fabric. A specific example thereof may include a porous film produced from one or more selected from the group consisting of high-density polyethylene, low-density polyethylene, linear low-density polyethylene, ultrahigh molecular weight polyethylene, polypropylene, and copolymer thereof, but it not limited thereto as long as it is a porous polymer film.

The porosity of the porous substrate is not particularly limited, but, for example, may be 5 to 95 vol %.

In an exemplary embodiment of the present invention, the composite separator may have a thickness of, though is not particularly limited, for example, 5 to 200 μm, and more specifically 5 to 100 μm.

The porous substrate may have a thickness of 3 to 100 μm, preferably 5 to 50 μm, and the one-dimensional inorganic material may have a thickness of 0.1 to 20 μm, preferably 0.5 to 5 μm.

In addition, the inorganic particle layer or the "heterogeneous material-based inorganic composite layer of a different dimension" may have a thickness of, though is not particularly limited thereto, for example, 0.1 μm to 100 μm, preferably 0.5 to 10 μm, and more preferably 1 to 5 μm.

In an exemplary embodiment of the present invention, the pore size of the porous substrate is, though is not particularly limited, for example, in a range of 0.001 to 10 μm, and the porosity may be in a range of 5 to 95%. In addition, the porosity of the composite separator of the present invention may be also in a range of 5 to 95%.

In still another general aspect, an electrochemical device includes: a positive electrode, a negative electrode, a separator, and an electrolyte, wherein the separator has the separator of any one embodiment described above. Specifically, it may provide a lithium secondary battery, and may be used as a separator of various batteries, and thus, is not limited.

The separator according to an exemplary embodiment of the present invention provides a composite separator having a one-dimensional inorganic material layer formed on a porous substrate, thereby providing a new composite separator which has no elution of an organic binder, is not swollen by an electrolyte solution, has no closure of pores, no gassing, and no electrolyte performance deterioration, and does not increase a battery volume by swelling, as compared with a conventional separator for a secondary battery in which a porous substrate and an inorganic particle layer (active layer) including an organic binder formed on one or both surfaces of the substrate are formed.

In addition, a separator which has further significantly improved electrolyte wettability, has excellent electrochemical safety due to its low resistance, and, in particular, though is obtained by forming a one-dimensional inorganic material layer on a porous substrate, has a further lower resistance value than the value of the porous substrate alone to have excellent electrical properties, and a lithium secondary battery using the same may be provided.

In addition, since the one-dimensional inorganic material layer of the present invention is directly bonded to the porous substrate, the electrolyte wettability are improved and resistance is low, so that electrochemical safety is excellent.

In particular, though the separator is obtained by forming a hydrophilic one-dimensional inorganic material layer on a porous substrate, its resistance value is lower than the value of the porous substrate alone, and thus, the separator has an effect of providing a separator having excellent electrical properties and a lithium secondary battery using the same.

In addition, the composite separator of the present invention may provide a porous composite separator of a new concept which may show a better lithium ion conductivity, a better electrolyte impregnation rate, better thermal safety, and the like than a conventional separator.

DESCRIPTION OF THE INVENTION

Figure 1:
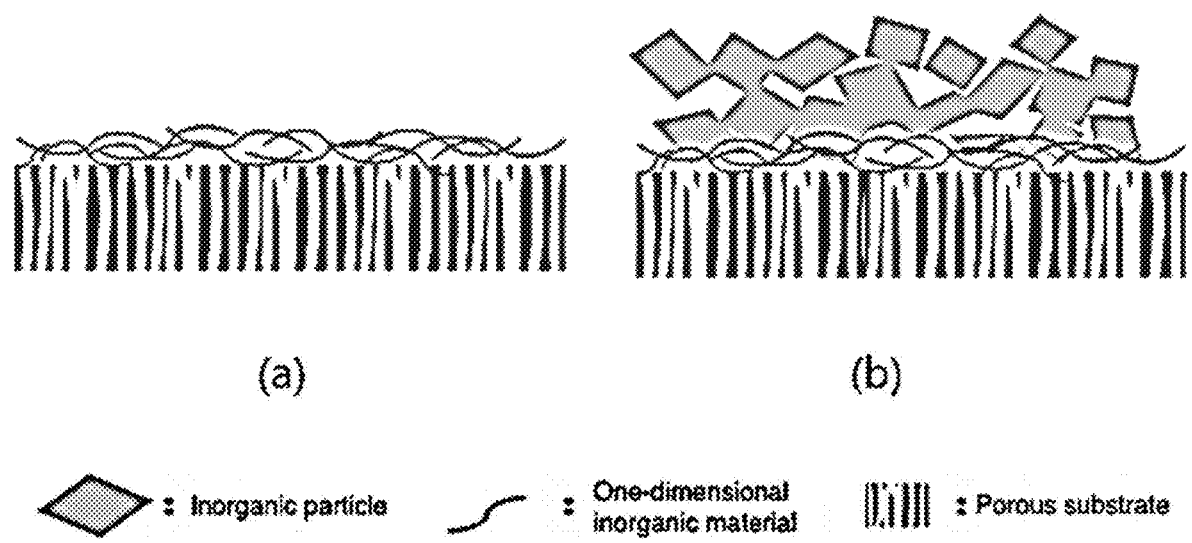
FIG. 1 is a conceptual diagram of a composite separator of the present invention.

Hereinafter, the present invention will be described in detail. However, the following exemplary embodiments are only a reference for describing the present invention in detail, and the present invention is not limited thereto, and may be implemented in various forms.

In addition, unless otherwise defined, all technical terms and scientific terms have the same meanings as those commonly understood by one of those skilled in the art to which the present invention pertains. The terms used herein are only for effectively describing a certain exemplary embodiment, and not intended to limit the present invention.

In the present invention, the "one-dimensional inorganic material" refers to a one-dimensional inorganic material in the form of hydrophilic nanowire or nanofiber, having a water contact angle of 90° or less, which is measured after forming a thin film by spin-coating a water dispersion containing 0.5 wt % of the one-dimensional inorganic material on a slide glass (soda lime glass) having a thickness of 2 mm at a speed of 3000 rpm for 40 seconds. In the present invention, the water contact angle of the thin film may be 70° or less, more preferably 60° or less. The water contact angle is measured using drop shape analyzer equipment (Mobile Surface Analyzer, Kruss, Germany).

An exemplary embodiment of the present invention relates to a composite separator including: (a) a porous substrate; and (b) a one-dimensional inorganic material layer formed by applying a one-dimensional inorganic material on one or both surfaces of the porous substrate, wherein the one-dimensional inorganic material layer includes no organic binder.

Another exemplary embodiment of the present invention provides a composite separator including: (a) a porous substrate; (b) a one-dimensional inorganic material layer formed of a one-dimensional inorganic material on one or both surfaces of the porous substrate; and (c) "a heterogeneous material-based inorganic composite layer of a different dimension" including inorganic particles and a one-dimensional inorganic material on an upper surface of the one-dimensional inorganic material layer.

Another exemplary embodiment of the present invention provides a composite separator including: (a) a porous substrate; (b) a one-dimensional inorganic material layer formed of a one-dimensional inorganic material on one or both surfaces of the porous substrate; and (c) an inorganic particle layer including inorganic particles and an organic binder on an upper surface of the one-dimensional inorganic material layer.

In addition, an exemplary embodiment of the present invention provides a method of producing a porous composite separator, including: (a) coating all or a part of a surface of a porous substrate film with a one-dimensional inorganic material dispersion; and (b) performing drying to form a one-dimensional inorganic material layer.

In addition, an exemplary embodiment of the present invention provides a method of producing a porous composite separator, including: (a) coating all or a part of a surface of a porous substrate film with a one-dimensional inorganic material dispersion; (b) performing drying to form a one-dimensional inorganic material layer; and (c) on the one-dimensional inorganic material layer, applying a slurry including inorganic particles and a one-dimensional inorganic material and performing drying to further form a "heterogeneous material-based inorganic composite layer of a different dimension", or applying a slurry including inorganic particles and an organic binder and performing drying to further form any one layer selected from inorganic particle layers.

In an exemplary embodiment of the present invention, the one-dimensional inorganic material layer may be formed of a hydrophilic inorganic nanowire or an inorganic nanofiber, and though is not particularly limited thereto, for example, a metal nanowire of Cu, Ag, Au, Ti, Si, Al, and the like, or a metal oxide nanowire or nanofiber of $Al_2O_3$, $SiO_2$, AlOOH, ZnO, $TiO_2$, $HfO_2$, and the like, and as the hydrophilic inorganic nanowire in various forms, a nanowire or nanofiber of which the surface is treated with a hydrophilic group may be used for increasing hydrophilicity.

The one-dimensional inorganic material is not particularly limited as long as it is in the form of inorganic nanowire or an inorganic nanofiber, but the inorganic nanowire is preferred since adhesive strength is more significant, and is more preferred for achieving the object of the present invention, and though is not limited thereto, an inorganic nanowire having a curve is more preferred.

The one-dimensional inorganic material may have, though is not particularly limited thereto, a wire diameter of 1 to 100 nm, a length of 0.01 to 100 μm, and a ratio of L/D (length/diameter) of 100 to 20,000 without limitation, and may independently have a specific surface area of 50 to 4000 $m^2/g$, but is not necessarily limited thereto.

In an exemplary embodiment of the present invention, the one-dimensional inorganic material may have, preferably, a diameter of 1 to 30 nm and a length of 0.01 to 100 μm.

In an exemplary embodiment of the present invention, the one-dimensional inorganic material layer does not include an organic binder, in principle, but when the organic binder is used as needed, the organic binder may be used at a content of 10 wt % or less, preferably 5 wt % or less, and more preferably 1 wt % or less with respect to the total content of the one-dimensional inorganic material layer, which corresponds to minimum conditions for suppressing chemical deterioration or swelling by an electrolyte.

Another exemplary embodiment of the present invention provides a porous composite separator in which the porous substrate, a one-dimensional inorganic material layer formed on the substrate layer, and an inorganic particle layer or a "heterogeneous material-based inorganic composite layer of a different dimension" formed on the inorganic particle layer are formed. Even the composite separator having the structure as described above has improved electrolyte wettability, further improved thermal resistance such as a shrinkage, may further prevent fire or rupture by an abnormal phenomenon such as a rapid temperature rise, and may provide excellent electrical properties such as lowered electrical resistance.

In addition, according to the present invention, a composite separator which has no pore closure, has excellent ion migration due to no pore closure by swelling and the like, has no obstacle to ion migration of lithium ions and the like, and may improve electrical properties such as a charge/discharge capacity or efficiency of a battery, as compared with a conventional one formed by directly applying an active layer obtained by coating a porous substrate layer with a mixed slurry of an organic polymer binder and inorganic particles, may be provided.

In addition, thermal resistance and chemical resistance are increased, and adhesive strength is sufficiently secured by a one-dimensional inorganic material layer.

Therefore, an exemplary embodiment of the present invention provides a porous composite separator of a new concept which may show all of thermal safety, electrochemical safety, excellent lithium ion conductivity, prevention of contamination with an electrolyte solution, and an excellent electrolyte impregnation rate.

FIG. 1 is a conceptual diagram of a composite separator of the present invention. It schematizes an embodiment in which a porous substrate and a one-dimensional inorganic material layer on the porous substrate are formed (a) and an embodiment in which a one-dimensional inorganic material layer formed on the porous substrate and an inorganic particle layer formed on the one-dimensional inorganic material layer are formed (b).

Figure 2:
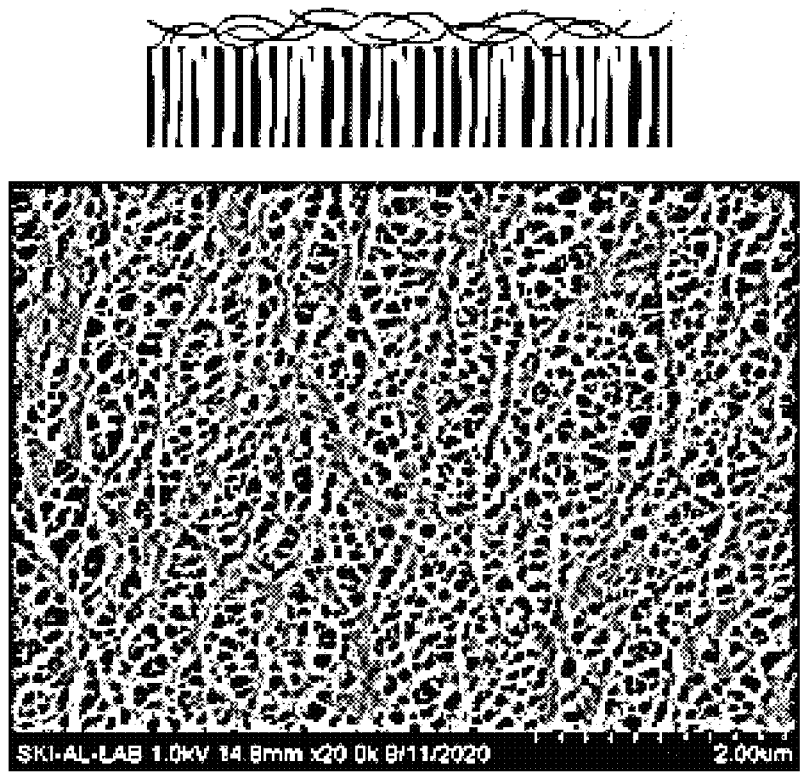
FIG. 2 is an SEM photograph of a surface of the composite porous film of Example 1 of the present invention.
Figure 2:
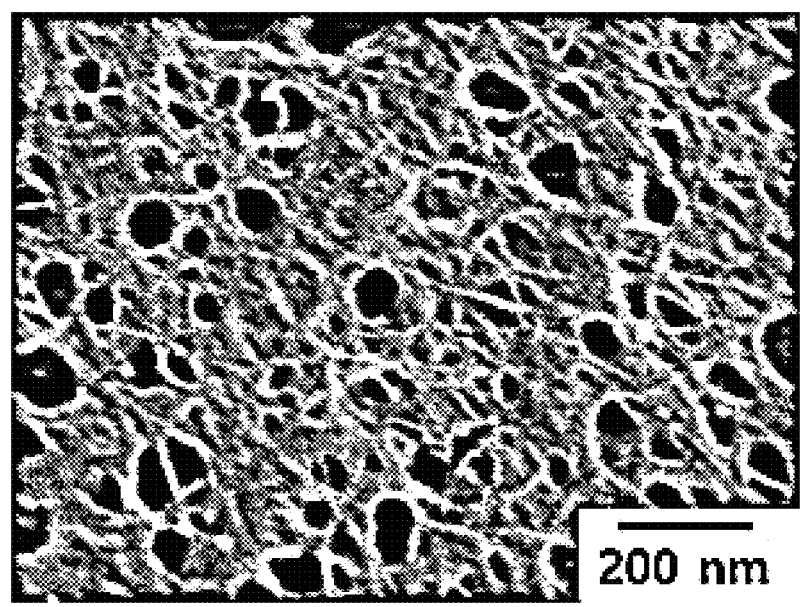
Figure 3:
FIG. 3 is an SEM photograph of a porous substrate used in Example 1.
Figure 3:
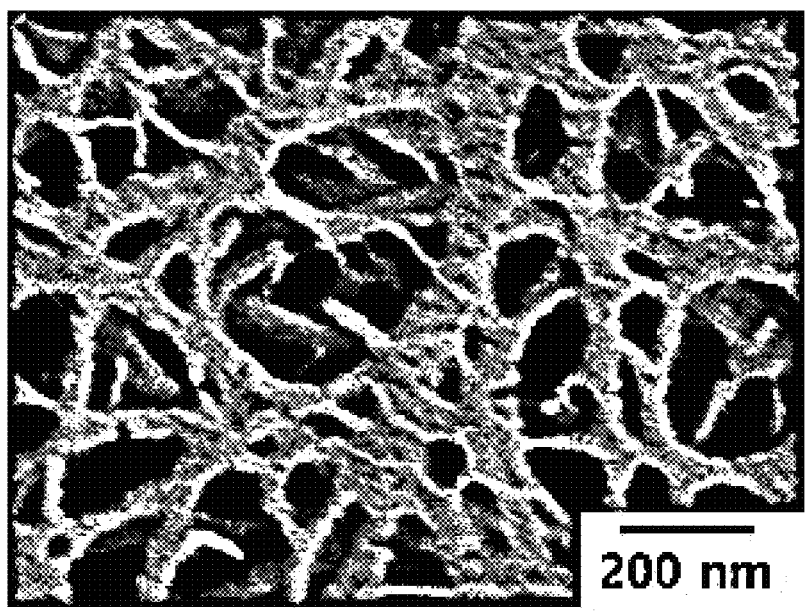

FIG. 2 is SEM photographs of a surface of the composite porous film of Example 1 of the present invention, and FIG. 3 is SEM photographs of the porous substrate used in Example 1. As seen in FIGS. 2 and 3, the size of pores is adjusted to be more uniform by forming the one-dimensional inorganic material layer, so that electrical properties and a charge/discharge effect are excellent, and the value is lowered even with decreased pores to provide a composite porous film having better electrical properties.

Figure 4:
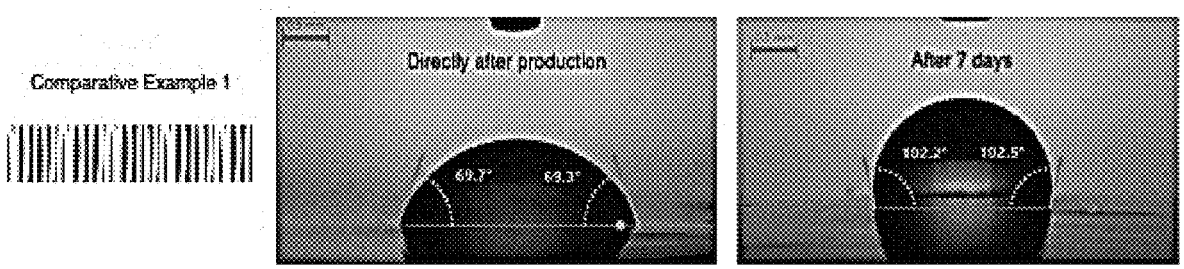
FIG. 4 shows comparison of results of measuring an initial water contact angle and a water contact angle after 7 days of the composite porous substrate of Example 1 of the present invention with results of measuring a water contact angle of a porous substrate itself of Comparative Example 1.
Figure 4:
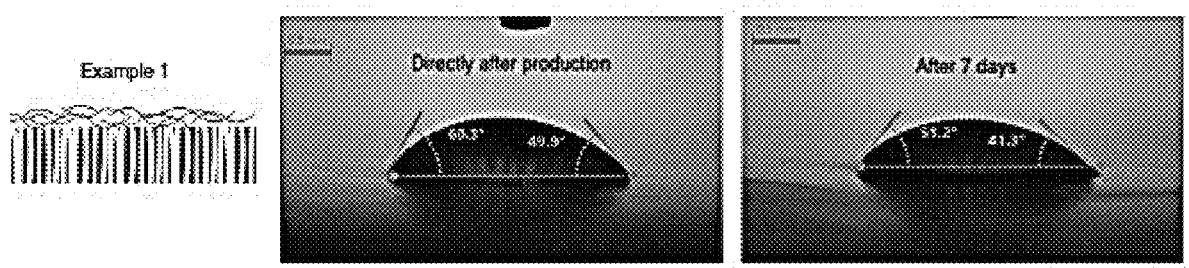

FIG. 4 shows comparison of results of measuring an initial water contact angle and a water contact angle after 7 days of the composite porous substrate of Example 1 of the present invention with results of measuring a water contact angle of a porous substrate itself of Comparative Example 1. Though hydrophilization was performed by a plasma treatment of the porous substrate of Comparative Example 1, the water contact angle was increased after 7 days of curing so that hydrophilization disappeared. When a one-dimensional inorganic material layer is formed on the porous substrate which is plasma-treated like the composite separator of Example 1, an initial water contact angle is low and a low water contact angle is maintained even after 7 days. By the effect, electrical resistance is significantly decreased, and in particular, the electrical resistance is significantly decreased even as compared with a porous substrate, and thus, electrolyte wettability are excellent, and the electrical properties and physical properties of a battery are shown to be excellent (see Table 1).

Figure 5:
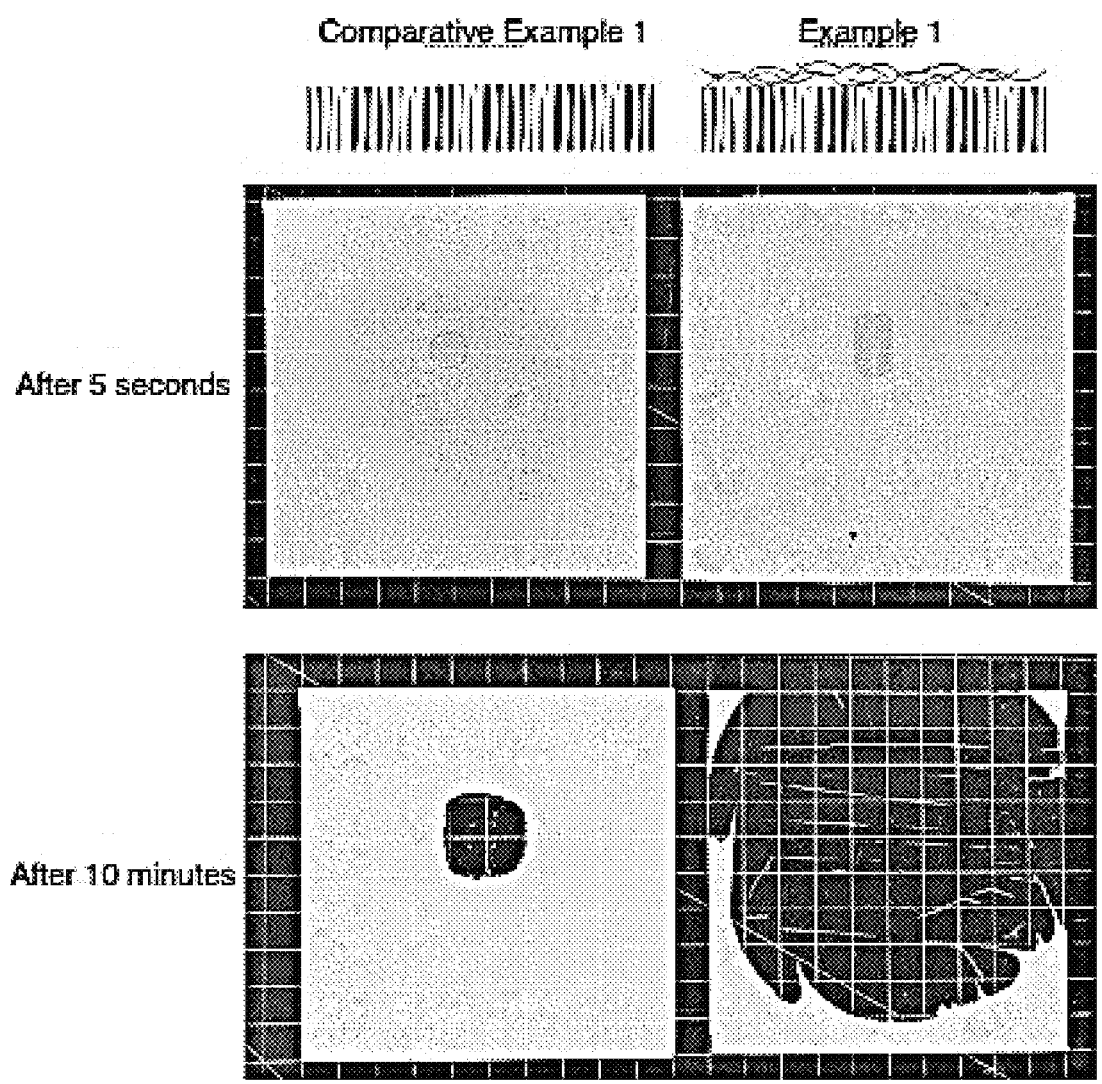
FIG. 5 shows wettability in an electrolyte solution in Example 1 and Comparative Example 1.

FIG. 5 shows electrolyte wettability in Example 1 and Comparative Example 1. It is seen that the composite separator of Example 1 of the present invention has significantly excellent electrolyte impregnability to have a spread area of an electrolyte solution increased by 20 times or more.

In particular, in an exemplary embodiment of the present invention, since the one-dimensional inorganic material used in the one-dimensional inorganic material layer uses those having a high surface area and a high length/diameter ratio as a hydrophilic inorganic nanowire or an inorganic nanofiber, agglomeration between one-dimensional inorganic materials occurs and the one-dimensional inorganic material is anchored to the pores of the porous substrate and firmly fixed, and thus, an excellent composite separator may be produced.

The hydrophilic inorganic nanowire, which is the one-dimensional inorganic material forming the one-dimensional inorganic material layer is not particularly limited as long as it achieves the object of the present invention, but, for example, may have a diameter of 1 to 100 nm, a length of 0.01 to 100 μm, and a length/diameter (L/D) ratio of 100 to 20,000, without limitation. In addition, without being particularly limited, the specific surface area may be 50 to 4000 m$^2$/g, preferably 300 m$^2$/g or more, and more preferably 1000 m$^2$/g or more. When the one-dimensional inorganic material is used, physical bonding such as a van der Waals force by a surface area is increased to form a composite with the porous substrate layer, may secure adhesive strength, and fixes agglomeration between nanowires and agglomeration between nanowire and substrate layer to further increase physical bonding to further increase adhesive strength.

The one-dimensional inorganic material is not particularly limited as long as it is chemically stable under battery operating conditions, and for example, may be a nanowire or nanofiber produced from any one or two or more selected from metals, carbon, metal oxides, metal nitrides, metal carbides, metal carbonates, metal hydrates, metal carbonitrides, lithium-based inorganic materials, piezoelectric inorganic metal compounds, and composite metal oxides of these metals.

For example, without limitation, it may be one or two or more selected from Cu, Ag, Au, Ti, Si, Al, Al$_2$O$_3$, SiO$_2$, AlOOH, ZnO, TiO$_2$, HfO$_2$, Ga$_2$O$_3$, SiC, SiC$_2$, quartz, NiSi, Ag, Au, Cu, Al, Si, Ag—Ni, ZnS, Al$_2$O$_3$, CeO$_2$, MgO, NiO, Y$_2$O$_3$, CaO, SrTiO$_3$, SnO$_2$, boehmite, ZrO$_2$, and the like.

In addition, the surface of the nanowire or the nanofiber is hydrophilized with a hydrophilic group to further increase hydrophilicity, thereby increasingly securing the composite and the adhesive strength with a substrate layer.

The thickness of the one-dimensional inorganic material layer formed on the porous substrate is not particularly limited, but may be in a range of 0.01 to 10 μm, preferably 0.1 to 10 μm.

In an exemplary embodiment of the present invention, the one-dimensional inorganic material may have an initial water contact angle $A_1$ and a water contact angle after 7 days $A_2$ which satisfy the following Equations 1 to 3:

$$A_1 \leq 90° \quad \text{[Equation 1]}$$

$$A_2 \leq 90° \quad \text{[Equation 1]}$$

$$A_2 \leq A_1 \quad \text{[Equation 1]}$$

More specifically, $A_1$ may be 85° or less, more specifically 80° or less, and more specifically 70° or less. $A_2$ may be 85° or less, more specifically 80° or less, more specifically 70° or less, and still more specifically 60° or less.

In addition, as in Equation 3, the water contact angle after 7 days may be the same as or lower than the initial water contact angle, and in an exemplary embodiment, $A_1-A_2$ may be 0 to 20°.

Next, a composite separator having an inorganic particle layer including inorganic particles and an organic binder or a "heterogeneous material-based inorganic composite layer of a different dimension" including inorganic particles and a one-dimensional inorganic material, formed on the one-dimensional inorganic material layer in an exemplary embodiment of the present invention will be further described.

The composite separator of the present invention has improved a problem of a conventional composite separator in which an inorganic particle layer including an organic binder is directly laminated on a porous substrate, in which the pore structure of the porous substrate is decreased or the nonuniformity of pores of the porous substrate is further increased by the polymer binder to prevent lithium ions from functioning smoothly to limit the improvement of electrical properties of a battery.

That is, as an exemplary embodiment of the present invention, as seen in FIGS. 2 and 3, the one-dimensional inorganic material layer formed of the one-dimensional inorganic material using substantially no organic binder is formed on the surface of the porous substrate to rather more improve the nonuniformity of the pores of the composite separator than the nonuniformity of the pores of the porous substrate, thereby improving battery performance, and also improving thermal resistance.

That is, as seen in FIGS. 2 and 3, the nonuniformity of the pores of the porous substrate allows formation of more uniform pores by forming a nanowire layer.

As an example of the present invention, inorganic particles which do not cause an oxidation or reduction reaction under conditions of operating a battery are more preferred, and also, those having ion transfer ability may be used. In an exemplary embodiment of the present invention, as an example, one or a mixture of two or more selected from Cu, Ag, Au, Ti, Si, Al, $Al_2O_3$, $SiO_2$, AlOOH, ZnO, $TiO_2$, $HfO_2$, $Ga_2O_3$, SiC, $SiC_2$, quartz, NiSi, Ag, Au, Cu, Al, Si, Ag—Ni, ZnS, $Al_2O_3$, $CeO_2$, MgO, NiO, $Y_2O_3$, CaO, $SrTiO_3$, $SnO_2$, boehmite, $ZrO_2$, lithium-based inorganic materials, piezoelectric inorganic metal mixtures, composite metal oxides of these metals, and the like may be used, without limitation, but the present invention is not limited thereto, and the inorganic particles are not limited unless they are electrochemically unstable to have great influence on battery performance.

The size of the inorganic particles forming the inorganic particle layer of the present invention is not limited as long as the object of the present invention is achieved, but, for example, the inorganic particles in a range of 0.001 to 10 μm are preferred for achieving the object of the present invention.

The content of the inorganic particles is not particularly limited, but the content of the inorganic particles in the inorganic particle layer or the "heterogeneous material-based inorganic composite layer of a different dimension" may be 50 to 99.99 wt %, preferably 80 to 99.99 wt %, and more preferably 90 wt % to 99.99 wt %, and the content of the organic binder or the one-dimensional inorganic material may be 0.01 to 50 wt %, preferably 0.01 to 10 wt % with respect to the total weight of each layer.

As the organic binder of the inorganic particle layer, a water-soluble or an organic solvent-soluble binder may be used, and preferably, a water-soluble binder is more preferred.

The organic binder is not particularly limited as long as it achieves the object of the present invention, but, for example, may include polyvinyl alcohol, polyvinyl acetate, an ethylene vinyl acetate copolymer, polyethylene oxide, cellulose acetate, cellulose acetate butylate, cellulose acetate propionate, polyvinylidene fluoride-hexafluoropropylene, polyvinylidene fluoride-trichloroethylene, polymethylmethacrylate, polyacrylonitrile, polyvinylpyrrolidone, cyanoethylpullulan, cyanoethyl polyvinyl alcohol, cyanoethyl cellulose, cyanoethyl sucrose, pullulan, carboxymethyl cellulose, an acrylonitrile styrene butadiene copolymer, polyimide, or a mixture thereof, and the like. Besides, any organic binder may be used without particular limitation as long as it is used as a binder of a separator for a secondary battery.

The thickness of the inorganic particle layer or the "heterogeneous material-based based inorganic composite layer of a different dimension" is not particularly limited as long as it achieves the object of the present invention, and, for example, may be 1 to 30 μm, preferably 2 to 10 μm, but is not limited thereto.

Layers laminated on the porous substrate layer of the present invention may further include other commonly known additives.

Next, the porous substrate of the present invention will be described.

As the porous substrate of the present invention, a porous polymer film, sheet, woven fabric, a non-woven fabric, and the like produced by a polymer used as a separator may be variously used, and a porous substrate having a lamination structure obtained by laminating two or more of each layer may also be included.

Preferably, as a polyolefin-based porous film, for example, low-density polyethylene, linear low-density polyethylene, high-density polyethylene, ultrahigh molecular weight polyethylene, polypropylene, a copolymer thereof, a derivative thereof, or the like may be used, without limitation.

In an exemplary embodiment of the present invention, in the case in which polyolefin is used as the porous substrate, when polyolefin as a hydrophobic film is coated with a hydrophilic inorganic nanowire dispersion, it is preferred to use a porous substrate which is hydrophilized by plasma, corona discharge, or the like in order to solve a problem of the surface of the hydrophobic polyolefin porous substrate being not coated well.

In the case of the porous substrate which is only treated with plasma or corona discharge, it is initially hydrophilized to have an increased water contact angle, but when it is exposed to the outside for, for example, about 7 days, the hydrophilic group disappears so that is hydrophobized, but when the one-dimensional inorganic material layer is formed on the porous substrate which is hydrophilized or not hydrophilized as in the present invention, the water contact angle is secured semi-permanently to further increase electrolyte impregnability to have an effect of increasing electrical properties, which is thus more preferred. In particular, it is more preferred to use a hydrophilized porous substrate since the effect is more remarkable.

The thickness of the porous substrate is not particularly limited as long as the object of the present invention is achieved, but may be in a range of 1 to 100 μm, preferably 5 to 60 μm, and more preferably 5 to 30 μm.

The pore size and the porosity of the porous substrate are not particularly limited, but the porosity may be in a range of 5 to 95% and the pore size (diameter) may be in a range of 0.01 to 10 μm, preferably 0.05 to 5 μm, but the present invention is not necessarily limited thereto.

The thickness of the composite separator of the present invention is not particularly limited, and, for example, may be preferably in a range of 5 to 100 μm, and more preferably in a range of 5 to 30 μm.

Hereinafter, a method of producing a composite separator of the present invention will be described.

In addition, an exemplary embodiment of the present invention provides a method of producing a porous composite separator, including: (a) coating all or a part of a surface of a porous substrate film with a one-dimensional inorganic material dispersion; and (b) performing drying to form a one-dimensional inorganic material layer.

In addition, an exemplary embodiment of the present invention provides a method of producing a porous composite separator, including: (a) coating all or a part of a surface of a porous substrate film with a one-dimensional inorganic material dispersion; (b) performing drying to form a one-dimensional inorganic material layer; and (c) on the one-dimensional inorganic material layer, applying a slurry including inorganic particles and a one-dimensional inorganic material and performing drying to further form a "heterogeneous material-based inorganic composite layer of a different dimension", or applying a slurry including inorganic particles and an organic binder and performing drying to further form any one layer selected from inorganic particle layers.

In the present invention, the one-dimensional inorganic material layer is produced with a dispersion by dispersing the one-dimensional inorganic material in a dispersion solvent. As the dispersion medium of the dispersion, water may be used, and other dispersion solvents, a lower alcohol such as ethanol, methanol, and propanol, a solvent such as dimethylformamide, acetone, tetrahydrofuran, diethyl ether, methylene chloride, DMF, N-methyl-2-pyrrolidone, hexane, and cyclohexane, or a mixture thereof may be used, but the present invention is not necessarily limited thereto.

A porous substrate may be coated with the dispersion produced in the above method and dried, thereby obtaining the porous composite separator having the hydrophilic one-dimensional inorganic material layer of the present invention.

Preferably, a polyolefin-based porous film may be coated and dried, thereby obtaining the separator of the present invention.

The coating method is not particularly limited, but, for example, coating may be performed by various methods such as slot die coating, knife coating, roll coating, die coating, dip coating, spray coating, gravure coating, mayer bar coating, imprinting, and spin coating, and thus, more description thereof will be omitted.

The one-dimensional inorganic material dispersion may be a dispersion at a concentration of a solid content of 0.01 to 5 wt %, and it is not necessarily limited to the concentration of the solid content.

Next, a method of forming an inorganic particle layer or a "heterogeneous material-based inorganic composite layer of a different dimension" on a one-dimensional inorganic material layer formed on the surface of the porous substrate will be described.

In the case of the inorganic particle layer, first, the binder or the inorganic particles are introduced to a solvent sequentially or at the same time and dispersed in a dispersion solvent to produce a dispersion. As the dispersion, water may be mainly used, and as other dispersion solvents, a lower alcohol such as ethanol, methanol, and propanol, a solvent such as dimethylformamide, acetone, tetrahydrofuran, diethyl ether, methylene chloride, DMF, N-methyl-2-pyrrolidone, hexane, and cyclohexane, or a mixture thereof may be used, but the present invention is not necessarily limited thereto.

In addition, in the case of the inorganic particle layer, it is preferred that inorganic particles or particles including inorganic particles and an organic binder are mixed and inorganic particle aggregates are crushed using a ball mill, a beads mill, a planetary mixer (pulverization and mixing method by revolution/rotation), and the like. Here, a crushing time is appropriately 0.01 to 20 hours, and a particle size of the crushed inorganic particles is preferably 0.001 to 10 μm as mentioned above, but the present invention is not limited thereto.

The one-dimensional inorganic material layer may be coated with the dispersion produced by the above method and dried to form the inorganic particle layer of the present invention. The coating method is not particularly limited for example, coating may be performed by various methods such as slot die coating, knife coating, roll coating, die coating, dip coating, and spray coating, and thus, more description thereof will be omitted.

In the present invention, the "heterogeneous material-based inorganic composite layer of a different dimension" is produced by introducing the inorganic particles and the one-dimensional inorganic material sequentially or together and performing dispersion to produce a dispersion, and coating the one-dimensional inorganic material layer with the dispersion and performing drying. In addition, the inorganic particles are first introduced and crushed by milling, and then the one-dimensional inorganic material is introduced and further dispersed to produce the dispersion. The coating method may be various methods such as slot die coating, knife coating, roll coating, die coating, dip coating, and spray coating, and thus, more description thereof will be omitted.

The composite separator of the present invention produced as described above may be used as an electrochemical device, for example, a separator for a lithium secondary battery. The electrochemical device is not particularly limited, but, for example, may be a primary battery, a secondary battery, a fuel battery, a capacitor, and the like.

When the separator of the present invention is commonly used in a battery, the battery is manufactured by a common manufacturing method of arranging and assembling a negative electrode, a separator, and a positive electrode, and injecting an electrolyte solution to complete the battery, and thus, details thereof will not be further described.

The positive electrode of the present invention is not limited as long as it is a common material, and, for example, may be a composite oxide formed of lithiated magnesium oxide, lithiated cobalt oxide, lithiated nickel oxide, or a combination thereof, and the like.

As a negative electrode active material, a common negative electrode active material may be used, and, for example, a lithium metal, activated carbon, a carbonaceous material such as graphite, and the like may be used, but the present invention is not particularly limited thereto.

Each of the positive electrode active material and the negative electrode active material is used by binding the material to a positive electrode current collector or a negative electrode current collector. As the positive electrode current collector, an aluminum foil, a nickel foil, and the like may be used, and the negative electrode current collector may be selected from copper, nickel, and the like, but since any material may be used without limitation as long as it is commonly used, the present invention is not limited thereto.

Since the electrolyte solution used in the present invention is not limited as long as it is used in the art, it will not be described any more in the present invention.

Hereinafter, preferred examples are presented in order to help a better understanding of the present invention, however, the following examples are only illustrative of the present invention, and do not limit the scope of the present invention.

Evaluation of Physical Properties

1. Gurley Permeation

As a gas permeability, a Gurley permeability was measured. It was measured according to the standard of ASTM D726, using Densometer available from Toyoseiki. How long it took for 100 cc of air to pass a separator having an area of 1 int was recorded in seconds and compared. The gas permeability described in Table 1 was calculated using the following equation and described.

ΔGurley permeability(sec)=gas permeability of separator having porous active layer formed−gas permeability of porous substrate 2. Measurement of Water Contact Angle The contact angles of the separators produced in the examples and the comparative examples were measured using drop shape analyzer equipment (Mobile Surface Analyzer, Kruss, Germany). The water contact angle was measured directly after producing the composite separator and after 7 days, respectively.

3. Measurement of Battery Resistance

Each impedance of the batteries produced by each assembly process was measured by the following method using a charge/discharge cycle device. A chamber temperature was maintained at room temperature (25° C.) using a device, and the battery was charged with a constant current-constant voltage (CC-CV) of 4.2 V and then discharged down to 2.5 V, as a method of measuring room temperature life and resistance. The charge/discharge was measured by performing 0.5 C charge and 0.5 C discharge from 4.2 V to 2.5 V 20 times. During the process, an average of DC-KR impedance value of each cycle was shown. A resistance increase rate was calculated using the following equation:

Resistance increase rate (%)=((resistance of separator including coating layer−resistance of PE film)/resistance of PE film)×100

(When the value is shown to be negative based on a resistance of an uncoated basic PE film, it means that the resistance of the coating separator is rather decreased as compared with the PE film so that performance is improved.)

Example 1

An aqueous dispersion in which 0.2 wt % of a boehmite nanofiber having an average diameter of 5 nm and an average length of 0.4 μm was dispersed was produced, and both surfaces of a polyethylene film having a thickness of 9 μm (porosity: 41%) was coated with the aqueous dispersion using a slot die and dried, thereby producing a composite separator. As the polyethylene film, a porous film having a hydrophilized surface which was treated so that the water contact angle of the porous film was 70° or less using a double-sided corona discharge device was used. The boehmite one-dimensional inorganic material layer of the composite separator produced was 15 nm and the physical properties are listed in Table 1.

Thereafter, 94 wt % of $LiCoO_2$ as a positive active material, 2.5 wt % of polyvinylidene fluoride as an adhesive, and 3.5 wt % of carbon black as a conductive agent were added to N-methyl-2-pyrrolidone (NMP) as a solvent, and stirring was performed to produce a uniform positive electrode slurry. An aluminum foil having a thickness of 30 μm was coated with the slurry, dried at a temperature of 120° C., and pressed to produce a positive electrode plate having a thickness of 150 μm.

In addition, 95 wt % of artificial graphite as a negative electrode active material, 3 wt % of acrylic latex having $T_g$ of −52° C. (Product name: BM900B, solid content: 20 wt %) as an adhesive, and 2 wt % of carboxymethyl cellulose (CMC) as a thickener were added to water as a solvent, and stirring was performed to produce a uniform negative electrode slurry. A copper foil having a thickness of 20 μm was coated with the slurry, dried at a temperature of 120° C., and pressed to produce a negative electrode plate having a thickness of 150 μm.

The positive electrode and the negative electrode produced above, and the separators produced above were used to assembly a pouch type battery in a stacking manner, and to each assembled battery, an electrolyte solution in which 1M lithiumhexafluorophosphate ($LiPF_6$) was dissolved in ethylene carbonate (EC)/ethylmethyl carbonate (EMC)/dimethyl carbonate (DMC)=3:5:2 (volume ratio) was injected to produce a lithium secondary battery. Thus, a pouch type lithium ion secondary battery having a capacity of 80 mAh was produced. The results of evaluating the lithium secondary battery produced are shown in Table 1.

Example 2

96 wt % of boehmite particles having an average particle diameter of 400 nm and 4 wt % of aqueous polyvinyl alcohol were introduced to water to produce an inorganic particle dispersion having a solid content of 15 wt %.

The inorganic particle dispersion was applied in a thickness of 2 μm to both surfaces of the boehmite nanowire layer of Example 1 using a slot die, and dried to form an inorganic particle layer.

The results of evaluating the properties of the separator and the electrical properties of a battery which was produced in the same manner as in Example 1 are listed in Table 1.

Example 3

The process was performed in the same manner as in Example 1, except that the surface of the porous substrate was not corona-treated, and the results are listed in Table 1.

Example 4

The process was performed in the same manner as in Example 2, except that a dispersion in which the inorganic particles and the one-dimensional inorganic material are mixed on the one-dimensional inorganic material layer was applied by a slot die and dried to form a heterogeneous material-based inorganic composite layer of a different dimension. The dispersion was produced and used by introducing 96 wt % of boehmite particles having an average particle diameter of 400 nm and 4 wt % of a boehmite nanofiber having an average diameter of 5 nm and an average length of 0.4 μm into water to prepare a dispersion having a solid content of 15 wt %.

Comparative Example 1

The process was performed in the same manner as in Example 1, except that the polyethylene film itself of Example 1 which was subjected to a corona discharge treatment was used, and the results are listed in Table 1.

Comparative Example 2

An inorganic particle dispersion was applied on both surfaces of the surface-treated microporous film of Comparative Example 1 using a slot die to form an inorganic particle layer at a thickness of 2 μm on one surface. The inorganic particle dispersion was produced and used by introducing 96 wt % of boehmite particles having an average particle diameter of 400 nm and 4 wt % of aqueous polyvinyl alcohol into water to prepare an inorganic particle dispersion having a solid content of 15 wt %. The physical properties were measured in the same manner as in Example 1, and the results are listed in Table 1.

TABLE 1

Physical properties of separator

| | ΔGurley permeability sec/100 cc | Water contact angle (directly after production) (°) | Water contact angle (after 7 days) | Battery Resistance (mΩ) Average | Battery Resistance increase rate % |
|---|---|---|---|---|---|
| Example 1 | 68 | 60 | 51 | 1095 | −12.76 |
| Example 2 | 103 | 30 | 30 | 1189 | −5.26 |
| Example 3 | 68 | 62 | 59 | 1098 | −12.5 |
| Example 4 | 105 | 31 | 32 | 1190 | −5.18 |
| Comparative Example 1 | 67 | 69 | 102 | 1255 | 0 |
| Comparative Example 2 | 104 | 36 | 41 | 1286 | 2.47 |

As seen in Table 1, though Example 1 was a composite separator in which an one-dimensional inorganic material layer was formed on a porous substrate, its Gurley permeability was similar to that of Comparative Example 1 which was a separator formed of only a porous substrate, and thus, it was found that the permeability was not deteriorated even by coating, and its water contact angle was maintained as it was even after time passes, and thus, impregnability to an electrolyte was maintained or lowered which was excellent. In addition, when a battery was produced and then its resistance was measured, the resistance value of the battery of Example 1 was very low, and the resistance value change rate was −12.76 which is lower than that of Comparative Example 1, and thus, had an excellent effect of having increased charge/discharge efficiency.

Meanwhile, Example 2 of the present invention in which the one-dimensional inorganic material layer and the inorganic particle layer were sequentially laminated and introduced also showed, when compared with Comparative Example 2 to which only the inorganic particle layer was introduced, an almost the same permeability properties in the Gurley permeability as Comparative Example 2, even though Example 2 further had a hydrophilic one-dimensional inorganic material layer, and the resistance value and the resistance value change rate of the battery of Example 2 were −5.26%, which was increased by 2.47% and showed better electrical properties as compared with Comparative Example 2, and thus, this shows improved battery performance and a chemically more stable effect. In addition, better physical properties were shown also in Example 4 in which the inorganic composite layer was formed.

In addition, when Example 2 in which the porous substrate was hydrophilized with plasma and Example 3 which was not plasma-treated were compared, it was confirmed that Example 2 was better in the physical properties such as uniform coatability and maintenance of hydrophilicity, and other physical properties were similar.

What is claimed is:

1. A composite separator comprising:
   a porous substrate; and
   a one-dimensional inorganic material layer formed of a one-dimensional inorganic material on one or both surfaces of the porous substrate, and
   an inorganic particle layer including particles including inorganic particles and an organic binder; or a heterogeneous material-based inorganic composite layer of a different dimension including particles including inorganic particles and a one-dimensional inorganic material, on an upper surface of the one-dimensional inorganic material layer,
   wherein the one-dimensional inorganic material layer comprises no organic binder.

2. The composite separator of claim 1, wherein the one-dimensional inorganic material is in a form of nanowire or nanofiber, and is any one or two or more selected from, metals, metal oxides, metal nitrides, metal carbides, metal carbonates, metal hydroxides, metal carbonitrides, and those materials of which the surface is treated with a hydrophilic group.

3. The composite separator of claim 2, wherein the one-dimensional inorganic material is one or two or more nanowires or nanofibers selected from the group consisting of Cu, Ag, Au, Ti, Si, Al, $Al_2O_3$, $SiO_2$, AlOOH, ZnO, $TiO_2$, $HfO_2$, $Ga_2O_3$, SiC, $SiC_2$, quartz, NiSi, Ag—Ni, ZnS, $CeO_2$, MgO, NiO, $Y_2O_3$, CaO, $SrTiO_3$, $SnO_2$ and $ZrO_2$.

4. The composite separator of claim 1, wherein the one-dimensional inorganic material is in a form of nanowire or nanofiber having a diameter of 1 to 100 nm and a length of 0.01 to 100 μm.

5. The composite separator of claim 1, wherein the one-dimensional inorganic material layer has an initial water contact angle $A_1$ and a water contact angle after 7 days $A_2$ satisfying the following Equations 1 to 3:

$$A_1 \leq 90° \quad \text{[Equation 1]}$$

$$A_2 \leq 90° \quad \text{[Equation 1]}$$

$$A_2 \leq A_1 \quad \text{[Equation 1]}$$

6. The composite separator of claim 1, wherein the one-dimensional inorganic material layer further comprises the organic binder at a content of 10 wt % or less with respect to total components of the one-dimensional inorganic material layer.

7. The composite separator of claim 1, wherein the porous substrate has a surface subjected to hydrophilization modification.

8. The composite separator of claim 1, wherein the inorganic particles are one or two or more selected from the group consisting of boehmite, $Al_2O_3$, $TiO_2$, $CeO_2$, MgO, NiO, $Y_2O_3$, CaO, $SrTiO_3$, $SnO_2$, ZnO, $ZrO_2$, lithium-based inorganic materials, piezoelectric inorganic metal mixtures, and composite metal oxides of these metals.

9. The composite separator of claim 1, wherein the inorganic particles have a size of 0.001 to 20 μm.

10. The composite separator of claim 1, wherein a content of the inorganic particles is 50 to 99.9 wt % in a total content of the inorganic particles and the organic binder.

11. The composite separator of claim 1, wherein the porous substrate is one or more selected from the group consisting of high-density polyethylene, low-density polyethylene, linear low-density polyethylene, ultrahigh molecular polyethylene, polypropylene, and copolymers thereof.

12. The composite separator of claim 1, wherein the composite separator has a thickness of 5 to 100 μm.

13. The composite separator of claim 1, wherein the composite separator has a pore size in a range of 0.001 to 10 μm and a porosity in a range of 5 to 95%.

14. An electrochemical device comprising: a positive electrode, a negative electrode, a separator, and an electrolyte, wherein the separator is the composite separator of claim 1.

15. A composite separator comprising:
a porous substrate of polyolefin porous film; and
a one-dimensional inorganic material layer formed of a one-dimensional inorganic material on one or both surfaces of the porous substrate,
wherein the one-dimensional inorganic material is one or more selected from the group consisting of an inorganic nanowire and an inorganic nanofiber,
wherein the porous substrate has a surface subjected to hydrophilization modification,
wherein the one-dimensional inorganic material layer includes no organic binder, and
wherein the one-dimensional inorganic material is in a form of nanowire or nanofiber having a diameter of 1 to 100 nm and a length of 0.01 to 100 µm.

16. The composite separator of claim 15, wherein the composite separator further includes: an inorganic particle layer including particles including inorganic particles and an organic binder; or a heterogeneous material-based inorganic composite layer of a different dimension including particles including inorganic particles and a one-dimensional inorganic material, on an upper surface of the one-dimensional inorganic material layer.

17. The composite separator of claim 16, wherein the one-dimensional inorganic material is one or two or more nanowires or nanofibers selected from the group consisting of Cu, Ag, Au, Ti, Si, Al, $Al_2O_3$, $SiO_2$, AlOOH, ZnO, $TiO_2$, $HfO_2$, $Ga_2O_3$, SiC, $SiC_2$, quartz, NiSi, Ag—Ni, ZnS, $CeO_2$, MgO, NiO, $Y_2O_3$, CaO, $SrTiO_3$, $SnO_2$, and $ZrO_2$.

18. The composite separator of claim 16,
wherein a content of the inorganic particles is 50 to 99.9 wt % in a total content of the inorganic particles and the organic binder.

19. The composite separator of claim 15, wherein the porous substrate is one or more selected from the group consisting of high-density polyethylene, low-density polyethylene, linear low-density polyethylene, ultrahigh molecular polyethylene, polypropylene, and copolymers thereof.

20. The composite separator of claim 15, wherein the composite separator has a thickness of 5 to 100 µm, and
wherein the composite separator has a pore size in a range of 0.001 to 10 µm and a porosity in a range of 5 to 95%.

* * * * *